Patented Nov. 28, 1922.

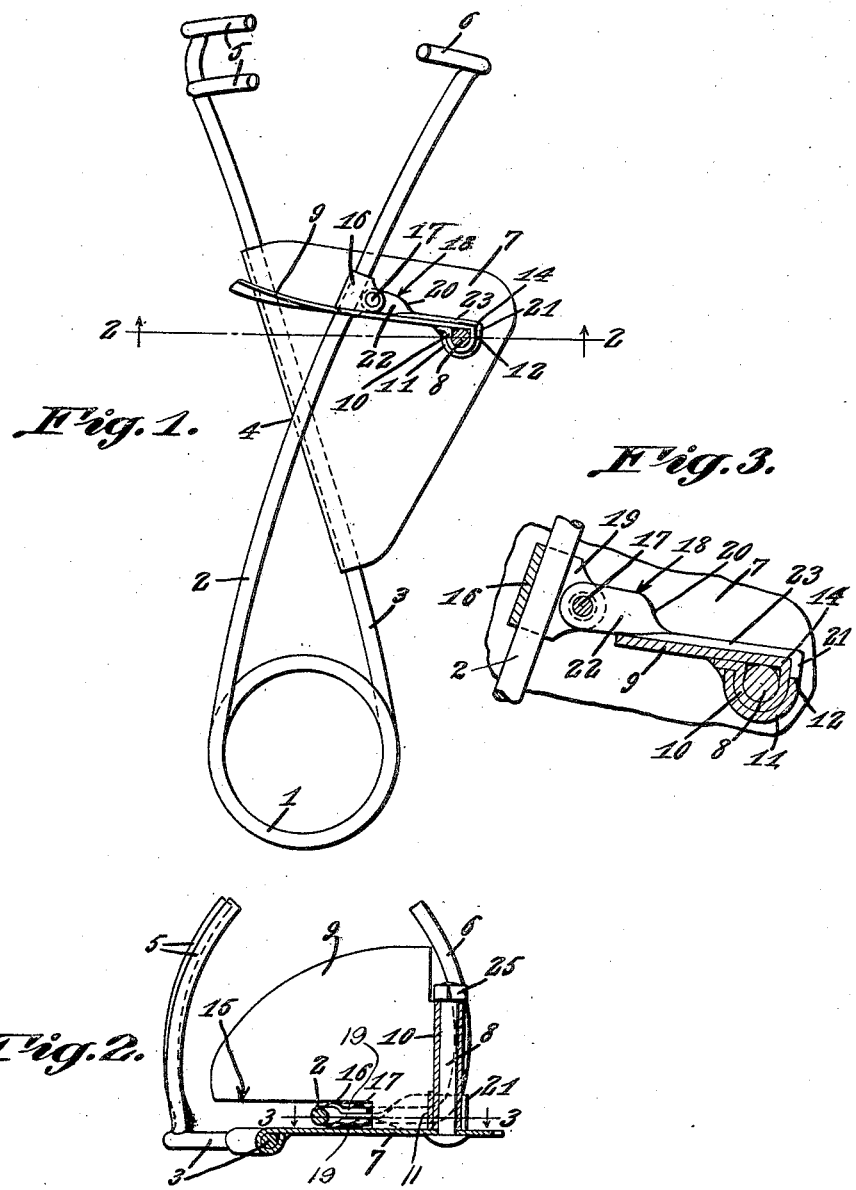

1,436,833

UNITED STATES PATENT OFFICE.

JOSEPH P. ULLMAN, OF BURCHARD, NEBRASKA.

TRAP.

Application filed August 10, 1921. Serial No. 491,247.

*To all whom it may concern:*

Be it known that I, JOSEPH P. ULLMAN, a citizen of the United States, residing at Burchard, in the county of Pawnee and State of Nebraska, have invented a new and useful Trap, of which the following is a specification.

The device forming the subject matter of this application is a trap, adapted primarily to catch burrowing animals, and the invention aims to provide novel means whereby the jaws of the trap may be held releasably in set position. A further object of the invention is to improve the construction of the spring arms which carry the jaws.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a trap constructed in accordance with the invention, the trap being set; Figure 2 is a section on the line 2—2 of Figure 1; and Figure 3 is a section on the line 3—3 of Figure 2.

The trap forming the subject matter of this application includes a coiled spring 1 merging into arms 2 and 3, which, when the trap is set, are crossed upon each other, as shown at 4. The arm 3 carries laterally projecting curved jaws 5, the arm 2 being supplied with a laterally projecting curved jaw 6.

A wing or support 7 is mounted on the arm 3 and projects therefrom in a direction approximately parallel to the plane in which the arm 2 swings. A pivot element 8, such as a bolt, is mounted in the wing 7 and projects therefrom, at right angles thereto. The numeral 9 marks a trigger plate, disposed at right angles to the wing 7, and terminates in a bearing 10 engaged about the pivot element or bolt 8, the bolt carrying a nut 25, holding the bearing on the pivot element. The bearing 10 is U-shaped in cross section, as shown in Figure 3, so that, where one wall of the bearing joins the plate 9, there is formed an angle 14. A strip 11 extends transversely of the bearing 10 and is mounted thereon, one end of the strip forming a shoulder 12. In one edge, the trigger plate 9 is cut away, as indicated at 15, to form a recess in which the arm 2 is adapted to move.

A bracket 16 is secured to the arm 2 and includes approximately parallel flanges 19 wherein a pivot element 17 is mounted. The numeral 18 designates a latch which is twisted upon itself as at 20, to form parts 22 and 23 disposed at an angle to each other, the construction being such that the part 22 may be received between the flanges 19 of the bracket 16 and be mounted pivotally on the element 17, the part 23 of the latch being adapted to lie flat on the trigger plate 9, when the trap is set, as shown in the drawings. The latch 18 terminates in a right angled finger 21.

The trap forming the subject matter of this application may be used in various ways, but, if desired, it may be set upright in the burrow of an animal. In order to set the trap, the jaws 5 and 6 are pulled apart, the arms 2 and 3 being disposed in crossed relation, as shown at 4. The part 23 of the latch 18 extends along the trigger plate 9, the angle shoulder 14 of the trigger plate being engaged in the angle formed by the elements 21 and 23 of the latch, the finger 21 of the latch contacting with the shoulder 12, as shown in Figure 3. When an animal treads upon the trigger plate 9, the trigger plate swings on the pivot element 8, the shoulder 12 engages the finger 21 and detaches the finger from engagement with the end of the trigger plate 9, whereupon the jaws 5 and 6 will swing toward each other, the animal being gripped between the jaws, the jaw 6 being so located that, when the trap is not set, the said jaw will be received between the jaws 5, the innermost jaw 5 engaging the arm 2.

What is claimed is:—

1. A trap comprising spring-operated arms provided adjacent to their outer ends with cooperating jaws, the arms being crossed upon each other; a support projecting from one arm; a trigger pivoted to the support at a point external to the other arm and projecting toward the first specified arm; a latch mounted pivotally on said other arm and projecting in a direction opposite to that in which the trigger extends, the latch engaging the trigger adjacent to the pivotal mounting thereof.

2. A trap comprising spring-operated arms provided at their outer ends with co-operating jaws, the arms being crossed on each other; a support projecting from one arm; a trigger; a pivot element connecting the trigger with the support; and a latch mounted pivotally on the other arm and extended across the pivot element, the latch having a finger cooperating with the trigger, to hold the trap set, the trigger being provided with a shoulder cooperating with the finger, to detach the finger from the trigger when the trigger is swung with respect to the pivot element.

In testimony that I claim the foregoing as my own, I have hereto affixed my signature in the presence of two witnesses.

JOSEPH P. ULLMAN.

Witnesses:
F. BSTANDIG,
A. D. BARCLAY.